(12) United States Patent
Reboldi et al.

(10) Patent No.: US 11,683,002 B2
(45) Date of Patent: Jun. 20, 2023

(54) PLANT FOR PRODUCING SOLAR ENERGY ABLE TO BE INSTALLED ON FARMLAND

(71) Applicant: REM TEC S.R.L., Asola (IT)

(72) Inventors: Alessandro Reboldi, Rezzato (IT); Ronald Knoche, Asola (IT); Paolo Parma, Chiari (IT)

(73) Assignee: REM TEC S.R.L., Asola (IT)

( * ) Notice: Subject to any disclaimer, the term of this patent is extended or adjusted under 35 U.S.C. 154(b) by 655 days.

(21) Appl. No.: 16/605,906

(22) PCT Filed: Apr. 18, 2018

(86) PCT No.: PCT/IB2018/052693
§ 371 (c)(1),
(2) Date: Oct. 17, 2019

(87) PCT Pub. No.: WO2018/193390
PCT Pub. Date: Oct. 25, 2018

(65) Prior Publication Data
US 2020/0127597 A1 Apr. 23, 2020

(30) Foreign Application Priority Data
Apr. 19, 2017 (IT) .................. 102017000042816

(51) Int. Cl.
*H02S 20/32* (2014.01)
*H02S 20/10* (2014.01)

(52) U.S. Cl.
CPC .............. *H02S 20/32* (2014.12); *H02S 20/10* (2014.12)

(58) Field of Classification Search
CPC .................. H02S 20/32; H02S 20/10
See application file for complete search history.

(56) References Cited

U.S. PATENT DOCUMENTS

2008/0308091 A1* 12/2008 Corio ............... F24S 30/425
126/606
2010/0101630 A1 4/2010 Kats
(Continued)

FOREIGN PATENT DOCUMENTS

CN 102349164 A 2/2012
CN 104797892 A 7/2015
(Continued)

OTHER PUBLICATIONS

TW Search Report dated Jan. 15, 2021 re: Application No. 106123676, pp. 1-16, citing: CN 102349164 A, US 2012/0152311 A1, US 2012/0160991 A1, CN 104797892 A, EP 2851630 A1, TW 371230 and EP 2406829.
(Continued)

*Primary Examiner* — Tae-Sik Kang
(74) *Attorney, Agent, or Firm* — Cantor Colburn LLP

(57) ABSTRACT

Plant for producing solar energy including a support structure formed from support poles aligned fixed to the ground, a movement system for receiving devices of solar energy positioned on poles arranged in a row, adapted for allowing the movement of the devices about a first axis and a second axis substantially perpendicular to one another, a rotating main tube about the first axis, to which a plurality of secondary tubes is connected, associated with said main tube, the secondary tubes having the receiver devices fixed to them and a movement mechanism for the primary tubes, and a sustaining and movement support arranged on each pole of said row, which has a housing that receives the main tube of the movement system and that allows the rotation thereof about the axis.

9 Claims, 5 Drawing Sheets

(56) References Cited

U.S. PATENT DOCUMENTS

| | | | |
|---|---|---|---|
| 2011/0041834 A1* | 2/2011 | Liao | F24S 30/452 |
| | | | 126/605 |
| 2012/0152308 A1* | 6/2012 | Miller | H02S 20/32 |
| | | | 136/246 |
| 2012/0152311 A1 | 6/2012 | Miller | |
| 2012/0160991 A1* | 6/2012 | Kats | H02S 20/32 |
| | | | 250/203.4 |

FOREIGN PATENT DOCUMENTS

| | | |
|---|---|---|
| EP | 2406829 A1 | 1/2012 |
| EP | 2851630 A1 | 3/2015 |
| KR | 1020090108261 A | 10/2009 |
| KR | 20140008343 A | 1/2014 |
| TW | M371230 U | 12/2009 |
| WO | 2010103378 A1 | 9/2010 |
| WO | 2012096715 A1 | 7/2012 |
| WO | 2013076573 A1 | 5/2013 |
| WO | 2013117722 A1 | 8/2013 |
| WO | 2014122518 A1 | 8/2014 |

OTHER PUBLICATIONS

International Search Report for corresponding application PCT/IB2018/052693 filed Apr. 18, 2018; dated Jun. 6, 2018.
Written Opinion for corresponding application PCT/IB2018/052693 filed Apr. 18, 2018; dated Jun. 6, 2018.

\* cited by examiner

Fig. 6
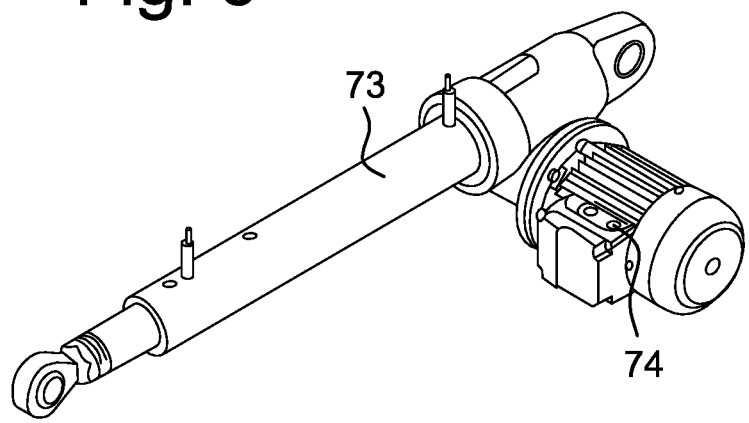
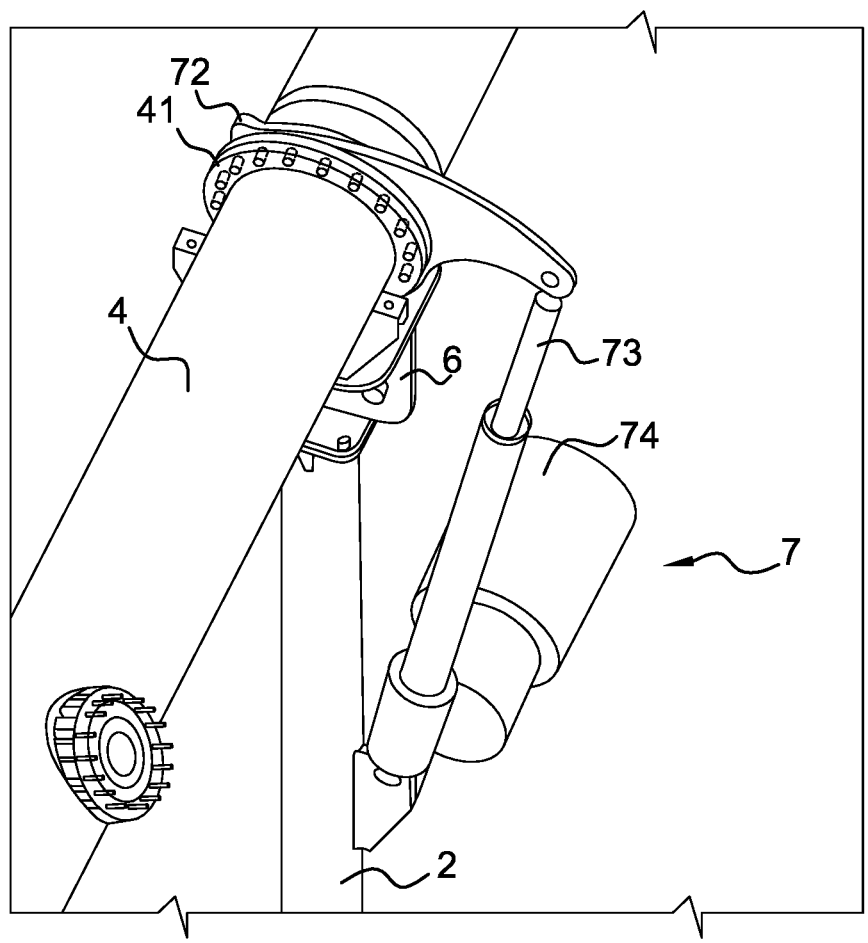
Fig. 5

Fig. 7a
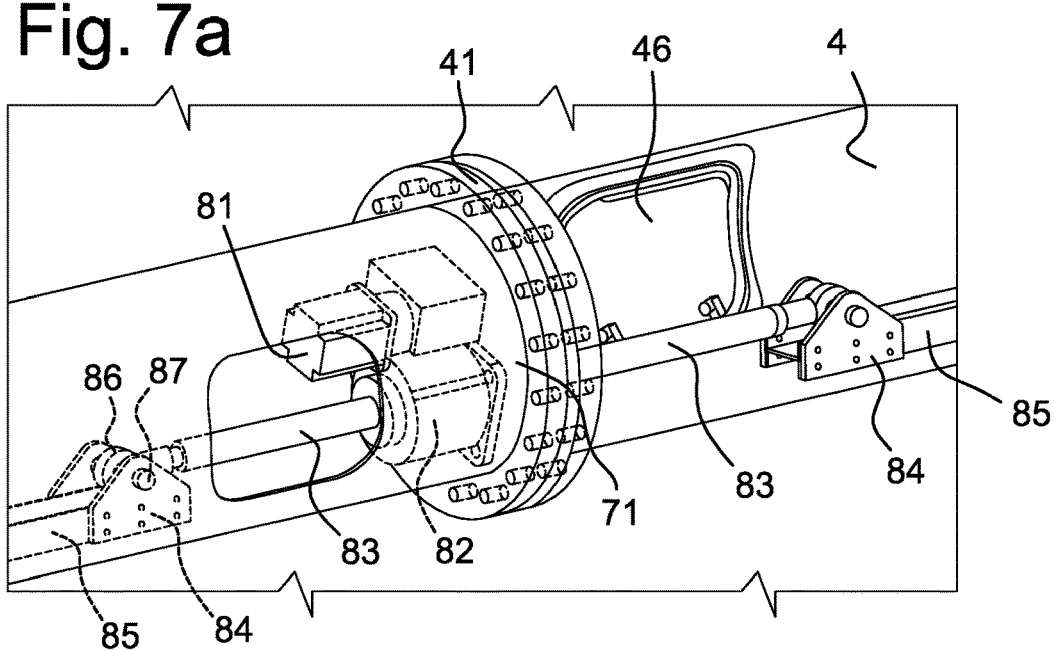
Fig. 7b
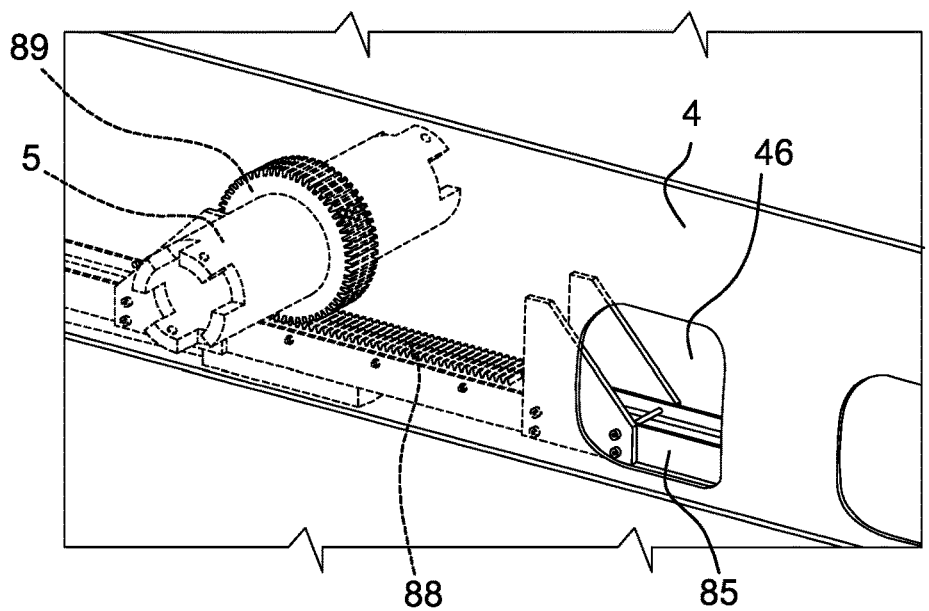
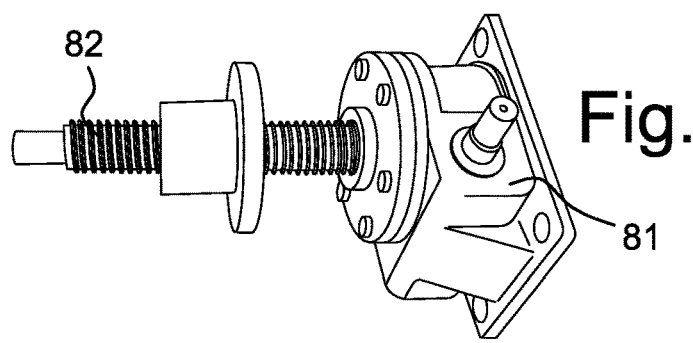
Fig. 8a

PLANT FOR PRODUCING SOLAR ENERGY ABLE TO BE INSTALLED ON FARMLAND

TECHNICAL FIELD

The present disclosure refers to a plant for producing solar energy formed from a support structure constrained to the ground, preferably farmland, adapted for sustaining a movement system for devices adapted for receiving sunlight, for example photovoltaic panels. In particular, the movement system of the present disclosure allows the movement about two axes X and Y of such devices to allow it to keep the photovoltaic panels or other devices adapted for capturing solar energy correctly oriented towards the sun.

BACKGROUND

Such a plant can be installed on farmland leaving the possibility of exploiting such land for its original purposes, i.e. farming crops or for animal grazing.

Systems for moving solar panels over two axes are known, which in the jargon are called "solar trackers".

The main purpose of a tracker is to maximize the efficiency of the device housed on-board. In the field of photovoltaics the modules mounted on-board a tracker are generally arranged geometrically on a single panel, a practice that avoids the use of a tracker for each individual module. The more the alignment is perpendicular with the solar rays, the greater the conversion efficiency and the energy produced over the same surface will be, and the smaller the solar panel surface necessary for the same power required, the lower the plant costs will be.

The most sophisticated trackers have two degrees of freedom, with which the perpendicular of the photovoltaic panels is arranged to align perfectly and in real time with the solar rays. The most cost-effective, but not the only, way to make them is to mount one tracker beside another. With these trackers increases in electrical production are recorded that reach even 35%45%, but at the price of a greater constructive complexity.

Such a type of solar tracker is shown in patent application WO2010103378 that describes a load-hearing structure formed from support poles kept in position by a network of tie rods, both the support poles and the tie rods being fixed in the ground through a hinge pin.

The solar tracker comprises a load-bearing horizontal main tube, which can rotate about its axis, to which a plurality of secondary tubes is connected, fixed perpendicular to the main tube and that can be rotated about its axis. The solar panels are fixed onto such secondary tubes. The ends of the main tube of the tracker are rested and fixed onto such support poles. The electrical cables for connecting the various panels and carrying a current generated by them to the outside are also located inside the main tube.

The control system of the tracker, integrated in the tracker itself, is capable of keeping the panels constantly oriented towards the sun, rotating both the main tube and the secondary tubes, so that the sun is perpendicular to the capturing surface of the panels.

Patent WO2013076573 describes a support pole structure of such a type that also supports wind power modules. Such a structure is made two-dimensional in a "checkerboard" arrangement and can also be installed on farming land, since it is elevated and the distance between the support poles is such as to allow the passage of even large farming machinery.

Patent application WO2013117722 describes a method and a plant for producing solar energy suitable for being installed on farmland. In such a plant, the photovoltaic modules and the support structure are oriented so that a farmed area, which is located under modules, is partially shaded. In this case, the orientation of the photovoltaic modules according to the disclosure allows the solar radiation to hit on the crops. Clearly, the solar panels and the movement mechanisms thereof have a rather significant weight and therefore a problem to be solved is how to make the system as light as possible. The bulk both of the panels and of the load-bearing structure must also be reduced to the minimum to allow the solar light to reach the ground beneath the farmland.

Moreover, the number of movement mechanisms to be arranged on the poles or in the tubes is a very critical parameter relative to size, weight and cost of the structure and also to allow the farmland on which it is positioned to receive the appropriate light/shade ratio for the crops positioned on the ground.

BRIEF SUMMARY

The purpose of the present disclosure is to overcome the aforementioned drawbacks by providing a system as described herein.

BRIEF DESCRIPTION OF THE DRAWINGS

The characteristics and advantages of the present disclosure will become clearer from the following description of an embodiment of the disclosure, given as an example and not for limiting purposes, referring to the attached schematic drawings, in which:

FIG. 5 illustrates the rotation mechanism for the primary tubes;

FIG. 6 illustrates a suitable actuator for such a rotation mechanism of the primary tubes;

FIGS. 7a-7b illustrate the rotation mechanism of the secondary tubes arranged inside the primary tubes;

FIGS. 8a-8b illustrate further motion transmission mechanisms to a worm screw for the movement of the primary tubes;

DETAILED DESCRIPTION

Figure 1:
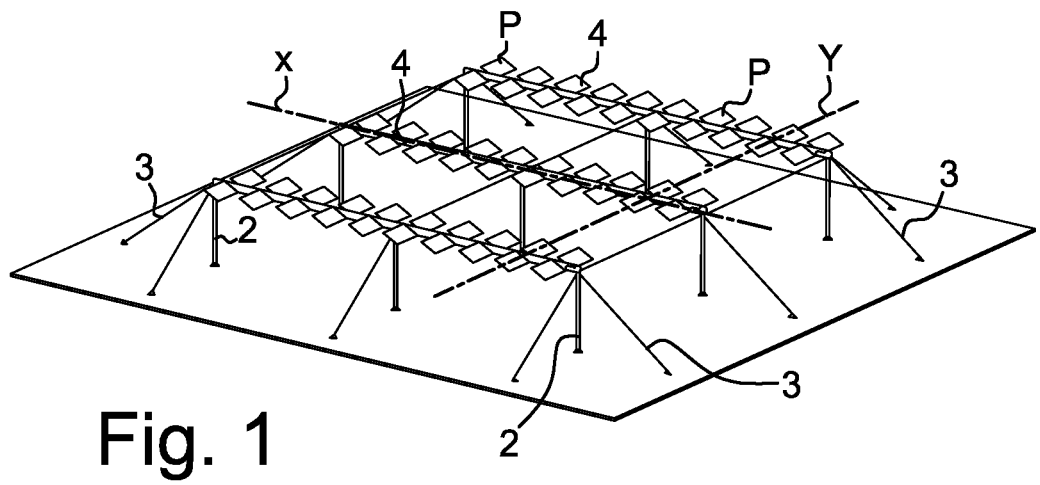
FIG. 1 illustrates a plant according to the present disclosure comprising a support structure and movement systems.
Figure 8B:
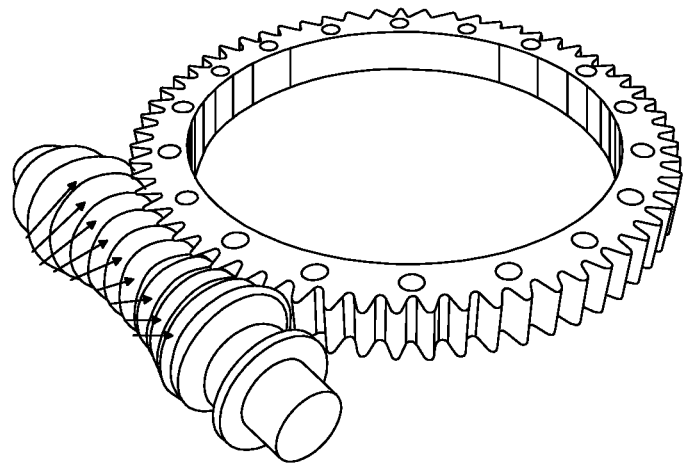
Figure 9:
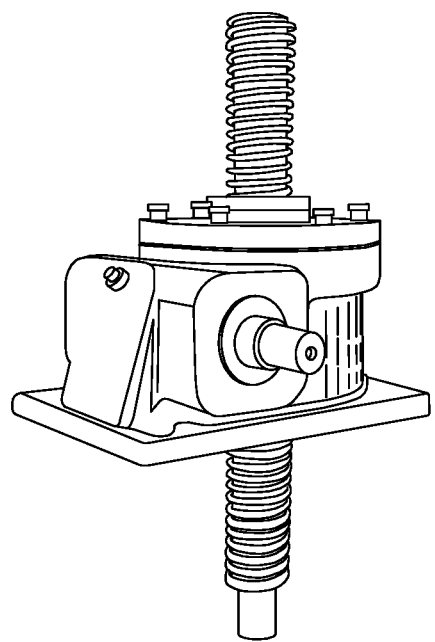
FIG. 9 illustrates a worm screw motion transmission mechanism for the rotation of the secondary tubes.
Figure 2:
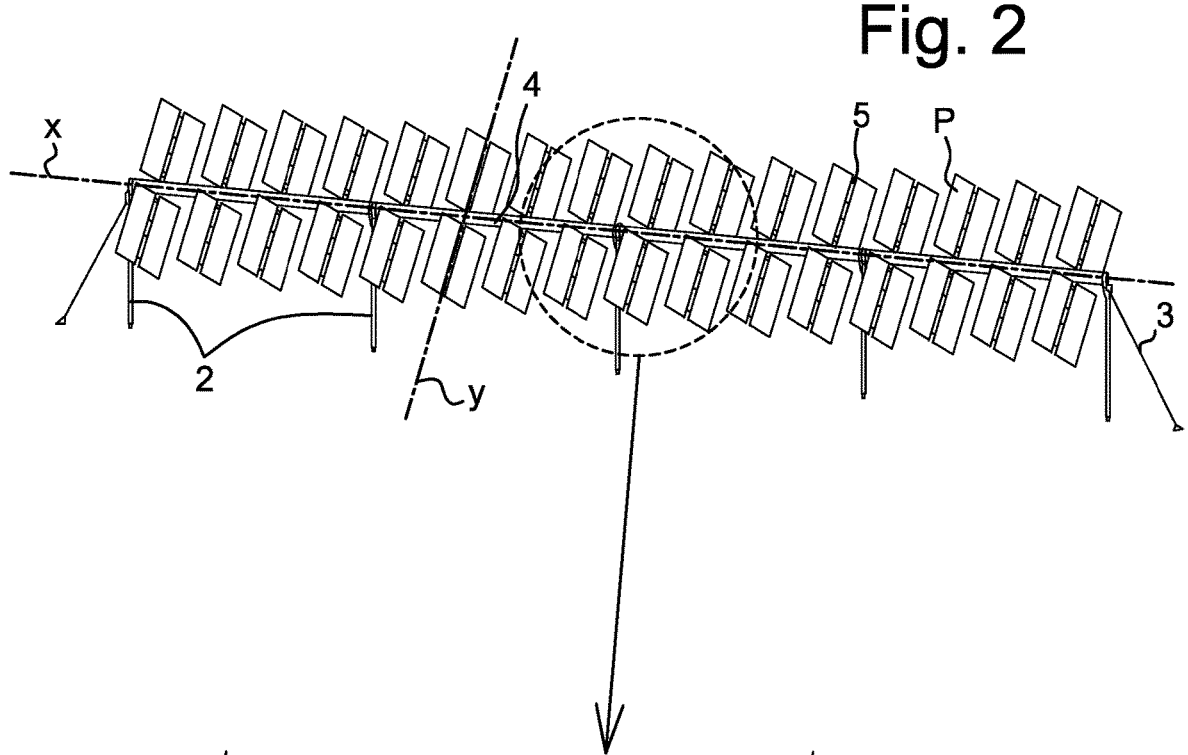
FIG. 2 illustrates a movement system according to the present disclosure installed on a row of poles of the support structure.
Figure 3:
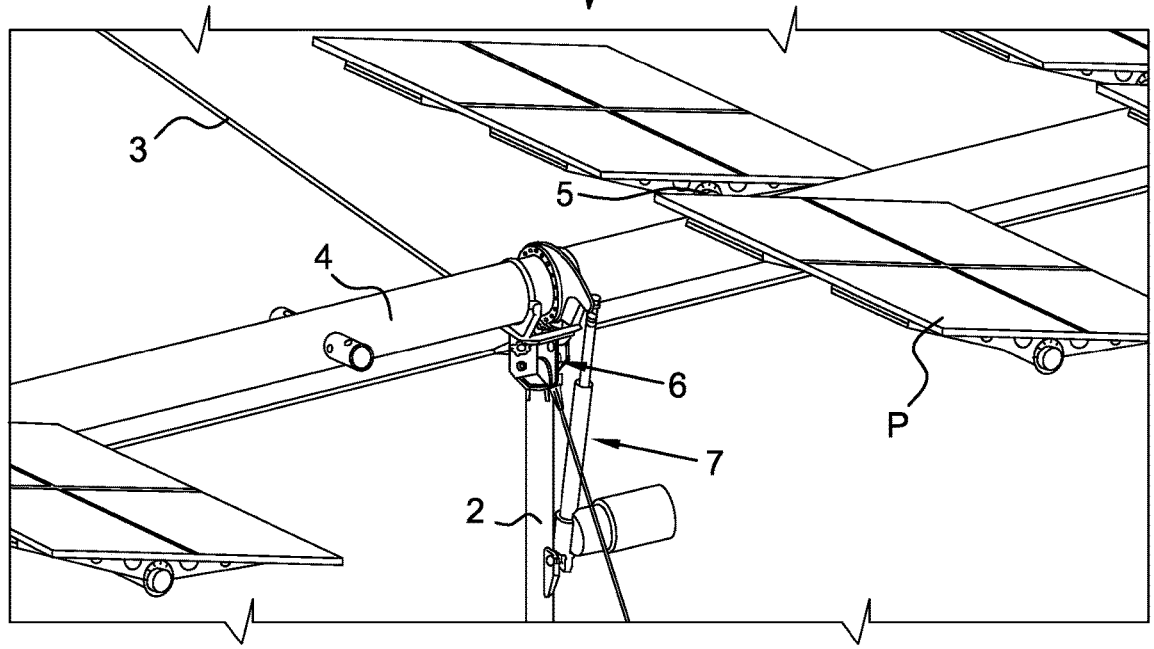
FIG. 3 illustrates an enlarged portion of FIG. 2 highlighting a sustaining and movement support, arranged on each of such poles of the support structure, for the primary tubes and the rotation mechanism of such primary tubes.
Figure 4A:
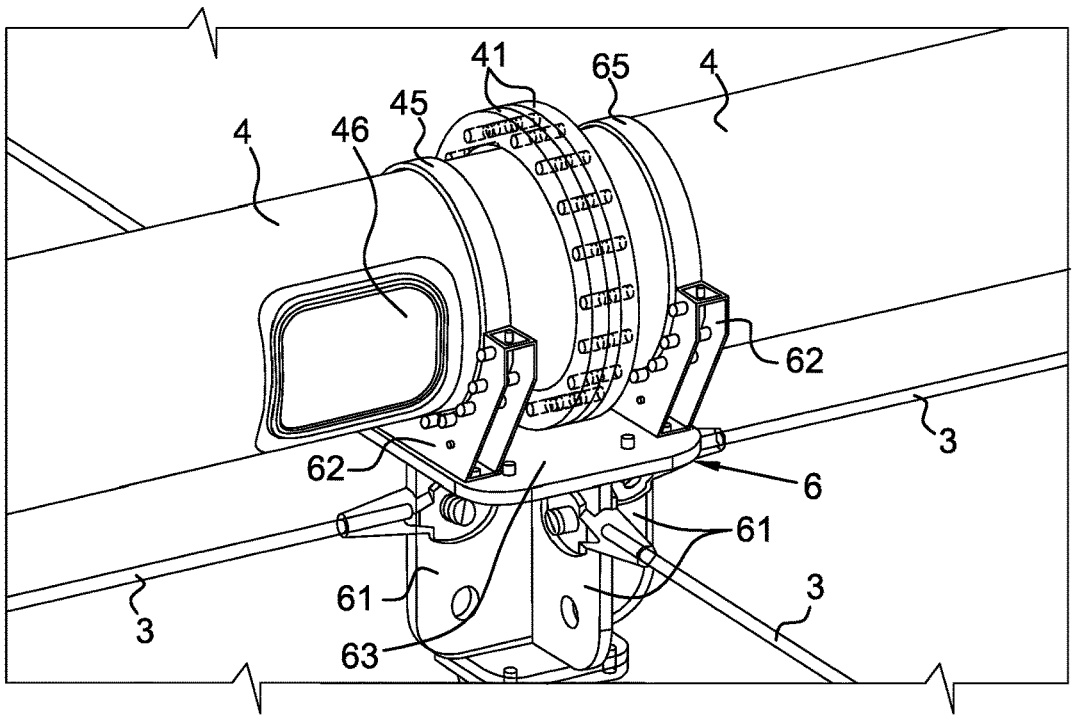
FIG. 4a illustrates the sustaining and movement support for the primary tubes.
Figure 4B:
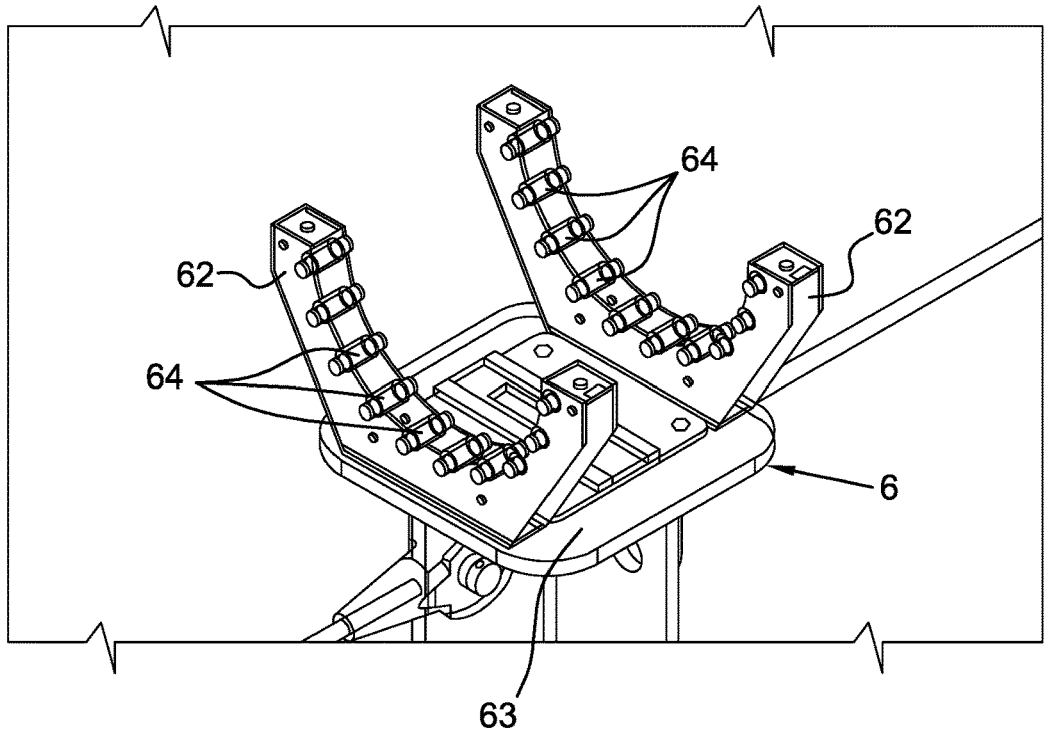
FIG. 4b illustrates the support of FIG. 4a without the primary poles.

With reference to the quoted figures the plant for producing solar energy according to the present disclosure allows the movement on a first axis X and a second axis Y substantially perpendicular to each other, of devices adapted for receiving the solar light, to allow it to keep a correct orientation towards the sun. For example, such devices are photovoltaic panels or other devices adapted for capturing solar energy.

The plant essentially comprises a support structure formed from support poles 2 preferably kept in position by a network of tie rods or steel bars 3, both the support poles and the tie rods being fixed in the ground through suitable pins, for example hinge pins. Such a structure can advantageously be configured two-dimensionally, for example of the "checkerboard" type and can also be installed on farmland, since it is elevated and the distance between the support poles is such as to allow the passage even of large farming machinery.

Such a support structure can alternatively be made through poles made of concrete or steel, which will have a portion driven into the ground and a part outside of the ground adapted for giving the structure the appropriate height from the ground. Said pole arrangement may or may not be connected by tie rods or steel bars.

Systems for the movement or orientation of such solar devices are positioned on said support structure and in particular on rows of poles.

Each movement system comprises a rotating main tube 4 about its own axis, and installed substantially horizontally, to which a plurality of secondary tubes 5 is connected, preferably fixed perpendicular to the main tube in a rigid manner or alternatively through suitable systems adapted for giving the ability to rotate. The receiver devices, in the specific case illustrated the photovoltaic panels P, are fixed on such secondary tubes.

The movement system also comprises a movement mechanism for the primary tubes and as an option also a movement mechanism for the secondary tubes.

Such movement systems are fixed onto such poles through a sustaining and movement support 6 arranged on each pole of said row, to which it is also possible to fix the aforementioned tie rods 3 and that has a housing that receives such a main tube 4 of the movement system and that allows the rotation thereof about such an axis X.

If the support structure is made through driven-in concrete poles, such a support will be given directly by the head of the pole that will be made flat, even through a horizontal steel plate 63 suitably fixed to the pole.

In the aforementioned alternative embodiment the tie rods can be omitted and the main tube is positioned on a row of poles on the top of which the sustaining and moving supports are arranged.

Such a support 6 comprises a lower portion, constrained to the pole, which has four wings 61 perpendicular to each other, each adapted for constraining one of the aforementioned tie rods. The upper portion comprises such a housing made from at least one saddle, preferably a pair of saddles 62, rested on the quoted horizontal plate 63 of the support. Such saddles have a substantially circular inner profile adapted for housing the primary tubes and are preferably provided along such a profile by a plurality of bearings 64 that allow the rotation of the tube. A strap 65 for each saddle 62 prevents the tube from coming out from the saddle, but does not prevent the rotation thereof inside them (for example a polyester band)

Preferably, according to the present disclosure, the constraint between two adjacent tubes occurs between the pair of saddles. The joining between two tubes occurs in particular by joining flanges 41 arranged at the end of the tubes themselves.

The movement mechanism of the primary tubes 7 comprises a bracket 72 crimped on the primary tube and forming a unit with it.

Such a bracket is preferably arranged between the two joining flanges 41 of two adjacent tubes and to which a linear actuator 73 is constrained, arranged between the quoted bracket and the support pole 2. In this way, by moving the linear actuator, exploiting the support pole as fixed pin, a rotation movement of the tube 4 is generated. For the movement of the actuator a first electric motor 74 is advantageously used.

The secondary tubes 5 may or may not also internally comprise the movement mechanism 8 of the secondary tubes about the second axis. Such a mechanism is advantageously arranged in the joining area of two adjacent primary tubes and comprises a second motor 81 and a transmission mechanism 82 both constrained to the joining flange 41 between the two primary tubes through a plate 71.

The motor, through a suitable transmission mechanism 82 sets in rotation a worm screw 83 arranged longitudinally in the main tube 4.

Such a worm screw crosses the flange 41 and the plate 71 that supports said transmission system 82, and is free to rotate and thus is capable of linearly transmitting the rotation motion inside two adjacent primary tubes. In this way, a single movement mechanism of the secondary tubes is capable of transmitting the rotation to two groups of secondary tubes each arranged on adjacent primary tubes.

Such a worm screw on both of the adjacent primary tubes is connected to a connection terminal 86 having a ball joint adapted for allowing the insertion of a pin 87 that, together with the suitable plates 84, allows the connection with a rectilinear profile 85, also arranged longitudinally inside the main tube. A rack 88, constrained to such a mobile plate and that moves as a unit with it when the worm screw is set in rotation, is guided on such a profile.

The racks along their path abut a plurality of gears 89 each fitted on a secondary tube in the position of intersection thereof with the main tube. When by means of the rotation of the worm screw the racks move, they set in rotation the gears 89 and therefore also the secondary tubes, thus the panels P about the axis Y.

The main tube is also provided with an opening 46 closed by a cover and positioned at motors and reduction mechanisms.

Clearly, the materials for the various parts have been suitably selected for correct balancing between weight and strength.

The movements of the motors are controlled by a suitable electronic controller that determines the angle that the panels must have through the day and in every weather condition, with feedback through a suitable inclination sensor.

The system foresees that the main tubes be mounted on a pole with the terminations that comprise both of the adjacent movement mechanisms.

In this way, it is possible to use a single electronic controller to control the movement of two systems simultaneously that still continue to move independently.

The electronic board of such a controller is open to different communication systems (for example Wi-fi, RS485 or fiber optic cable). Depending on requirements, it is possible to adopt one solution rather than another.

The invention claimed is:
1. A plant for producing solar energy comprising:
  a support structure formed from at least two support poles aligned fixed to the ground, said at least two support poles are kept in position by a network of tie rods, a movement system for receiver devices of solar energy positioned on said at least two support poles arranged in a row, adapted for allowing movement of receiver devices about a first axis and a second axis substantially perpendicular to one another, the movement system comprising:

a rotating main tube about the first axis, to which a plurality of secondary tubes is connected, associated with said main tube, the secondary tubes having the receiver devices fixed to the secondary tubes, a movement mechanism for a plurality of the primary tubes, a sustaining and movement support arranged on each support pole of said row, which has a housing that receives the main tube of the movement system and that allows rotation of the main tube about the first axis, wherein said housing is made on the upper portion of said support and comprises a pair of saddles, arranged on a horizontal plate of the support, which a substantially circular inner profile adapted for housing the primary tubes and for allowing the rotation of the primary tubes in the saddle about the longitudinal axis of the tube, a union between two adjacent tubes takes place between the two adjacent tubes by joining flanges arranged at the end of the main tubes, said support comprising a lower portion, constrained to at least one of the at least two support poles, which has four wings perpendicular to one another each adapted for constraining one of the tie rods to the at least one of the at least two support poles.

2. The plant according to claim 1, wherein along the profile there is a plurality of bearings that allow the rotation of the tube.

3. The plant according to claim 1, wherein the movement mechanism for the plurality of primary tubes comprises a bracket, crimped on the primary tube and fixedly connected with the primary tube, to which a linear actuator is constrained, arranged between the bracket and one of the at least two support poles.

4. The plant according to claim 3, wherein the bracket is arranged between two joining flanges of two adjacent primary tubes.

5. The plant according to claim 1, wherein the secondary tubes rotate about the second axis substantially perpendicular to the main tube through the movement mechanism.

6. The plant according to claim 5, wherein the movement mechanism for the secondary tubes comprises a worm screw arranged longitudinally in the main tube set in rotation by suitable motor means that crosses a support plate arranged between two joining flanges in which said worm screw is free to rotate, the worm screw is fastened through an end joint and connecting plates to a rectilinear profile, also arranged longitudinally inside the main tube, wherein a rack is guided on the profile, said rack being constrained to a mobile plate and moving as a unit with said mobile plate when the worm screw is set in rotation, the rack along a path abuts a plurality of gears each fitted on a secondary tube in a position of intersection thereof with the main tube.

7. The plant according to claim 6, wherein the worm screw, crossing the flange, is capable of moving the racks of two adjacent primary tubes, configured to transmit rotation motion to the secondary tubes arranged on two adjacent primary tubes constrained on one same support pole.

8. The plant according to claim 1, wherein the main tube is provided with an opening closed by a cover positioned at motors and reduction mechanisms.

9. The plant according to claim 1, wherein the support structure is of the two-dimensional "checkerboard" type and is installed on farmland.

* * * * *